United States Patent
Lynch

[15] 3,680,359
[45] Aug. 1, 1972

[54] TRANSFORMER HAVING INCIPIENT FAULT DETECTOR
[72] Inventor: John C. Lynch, Canonsburg, Pa.
[73] Assignee: McGraw-Edison Company, Elgin, Ill.
[22] Filed: May 2, 1968
[21] Appl. No.: 734,831

Related U.S. Application Data
[63] Continuation-in-part of Ser. No. 391,681, Aug. 24, 1964, abandoned.

[52] U.S. Cl. .................73/27 R, 73/23, 317/14 K
[51] Int. Cl. ....................G01n 27/18, H02h 7/14
[58] Field of Search.....73/27, 19, 23; 23/232 E, 254, 23/254 E; 317/14.9, 15

[56] References Cited

UNITED STATES PATENTS

| | | |
|---|---|---|
| 1,971,038 | 8/1934 | Hamilton..........................73/27 |
| 2,687,036 | 8/1954 | Minter..............................73/27 |
| 1,997,659 | 4/1935 | Styer.............................73/27 X |
| 2,472,645 | 6/1949 | Clark..............................73/27 |
| 3,026,713 | 3/1962 | Block et al........................73/27 |
| 3,111,388 | 11/1963 | Horelick et al. .................23/232 |

FOREIGN PATENTS OR APPLICATIONS 293,705   11/1929   Great Britain....................73/27

Primary Examiner—Richard C. Queisser
Assistant Examiner—Ellis J. Koch
Attorney—Richard C. Ruppin

[57] ABSTRACT

A thermal conductivity gas analysis incipient fault detector for a gas-cushion transformer. The gas from the gas-cushion is continuously circulated to gas analysis cavities and then returned to the gas-cushion. The gas is analyzed by comparison of its thermal conductivity to the thermal conductivity of a standard gas.

6 Claims, 8 Drawing Figures

INVENTOR
JOHN C. LYNCH

BY Lee H Kaiser

ATTORNEY

INVENTOR
JOHN C. LYNCH

BY Lee H Kaiser

ATTORNEY

INVENTOR
JOHN C. LYNCH

BY Lee H. Kaiser

ATTORNEY

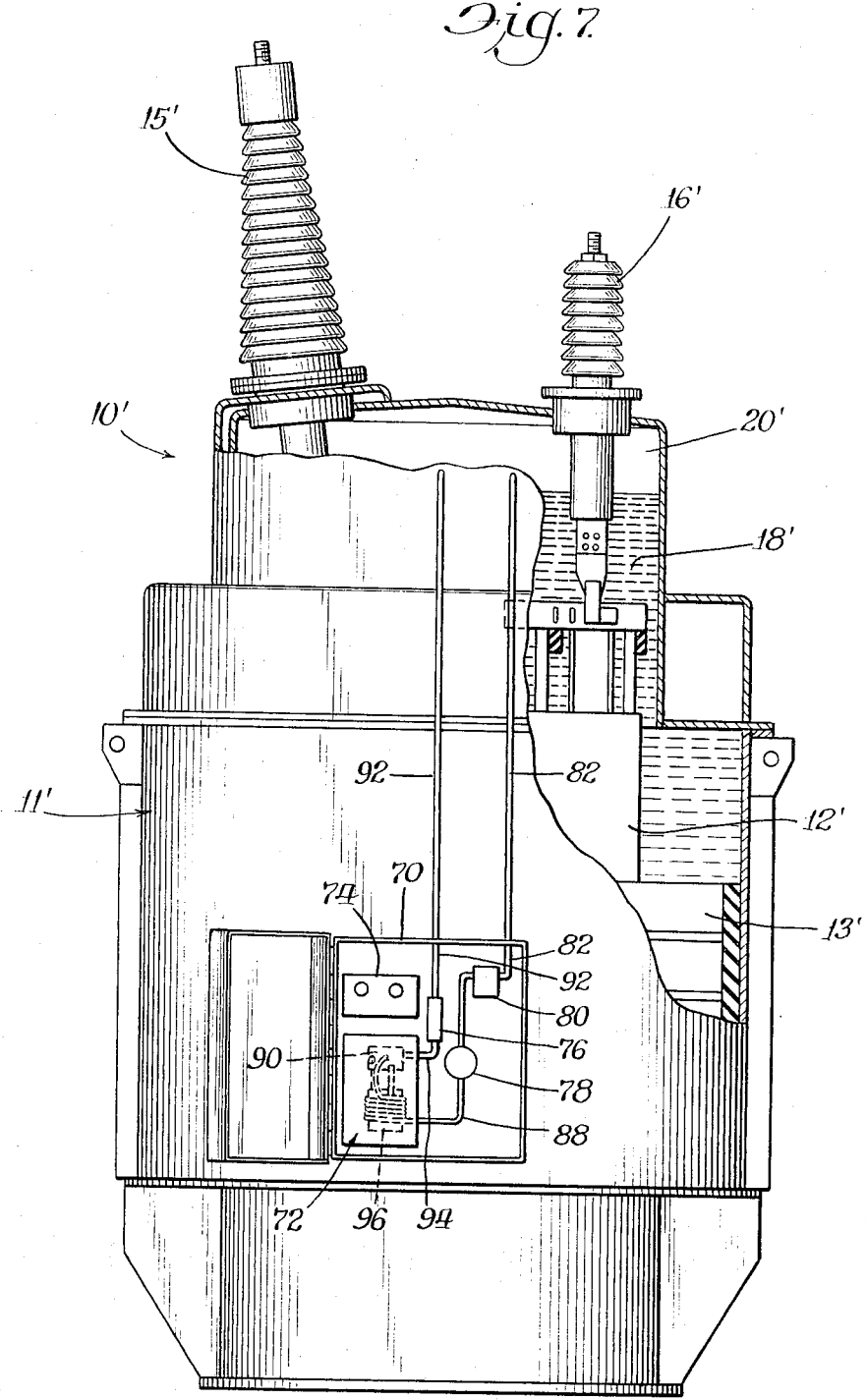

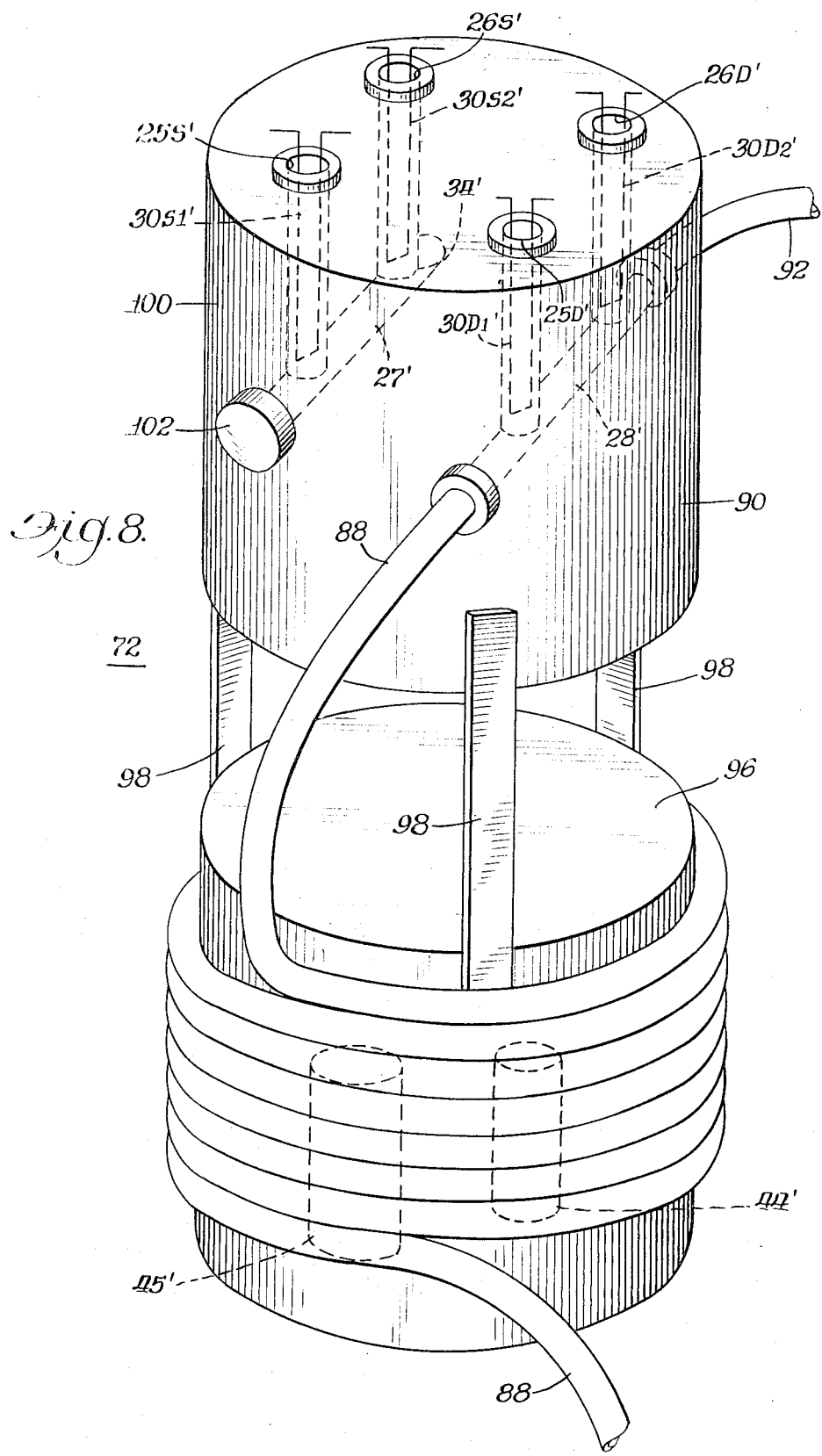

3,680,359

TRANSFORMER HAVING INCIPIENT FAULT DETECTOR

This application is a continuation-in-part of my application Ser. No. 391,681, filed Aug. 24, 1964, now abandoned.

This invention relates to the detection of incipient faults in an electrical transformer and, more particularly, to an oil-filled, sealed or gas-blanketed electrical power transformer having means for continuously monitoring the gas space above the oil for products of decomposition of the transformer insulation resulting from an incipient fault within the transformer.

Failure of large kva, oil-filled, power transformers in service is often accompanied by rapid rise of pressure within the casing due to arcing under the oil which may burst the casing and spread flaming oil over the surrounding area. Such failure of large kva transformers is a fire and explosion hazard and may result in outage of electrical service to hundreds of utility customers. In examining power transformers which have failed in service, evidence is often found that failure has been preceded by an incipient condition which existed for a period of time before failure and involved heating and decomposition of the oil and/or solid insulation. Decomposition of the oil and solid insulation generates combustible gases which add to the explosive and fire hazards associated with a transformer insulation failure. The Buchholz relay accumulates and indicates the pressure of certain combustible gases for conservator type transformers and thus permits investigation and the necessary remedial action before insulation failure in conservator type transformers. However, there is no convenient means in general use to continuously measure for combustible gases in the gas space of sealed and gas-blanketed power transformers.

In U.S. Pat. No. 3,111,388 to Horelick et al., in which I am one of the joint inventors, a method and means are disclosed for manually making periodic tests for low-energy incipient faults in power transformers having a gas space above the insulating oil. However, the invention disclosed in U.S. Pat. No. 3,111,388 necessitates taking and isolating a sample of the gas above the oil and manually analyzing the gas in a portable instrument for products of decomposition of the insulation. It will be appreciated that such method permits only periodic testing of transformers since the gas above the oil cannot be sampled by continuously moving the gas into a chamber or cell, analyzing the gas while in such cell and returning the gas to the space above the oil.

It is an object of the invention to provide an oil-filled, sealed electrical power transformer having continuously operable means for detecting gases resulting from incipient faults within the transformer in the gas above the oil.

It is another object of this invention to provide an apparatus and method for sampling and analyzing gas from the gas cushion of an electrical power transformer by continuously circulating the gas through an analysis cell and therein determining the content of the gas.

These and other objects and advantages of the invention will be more readily apparent from the following detailed description when taken in conjunction with the accompanying drawing wherein:

FIG. 7 is an elevational view, partially in section, illustrating another embodiment of the invention; and FIG. 8 is a perspective view of the continuous gas monitoring means of the transformer of FIG. 7.

Figure 1:
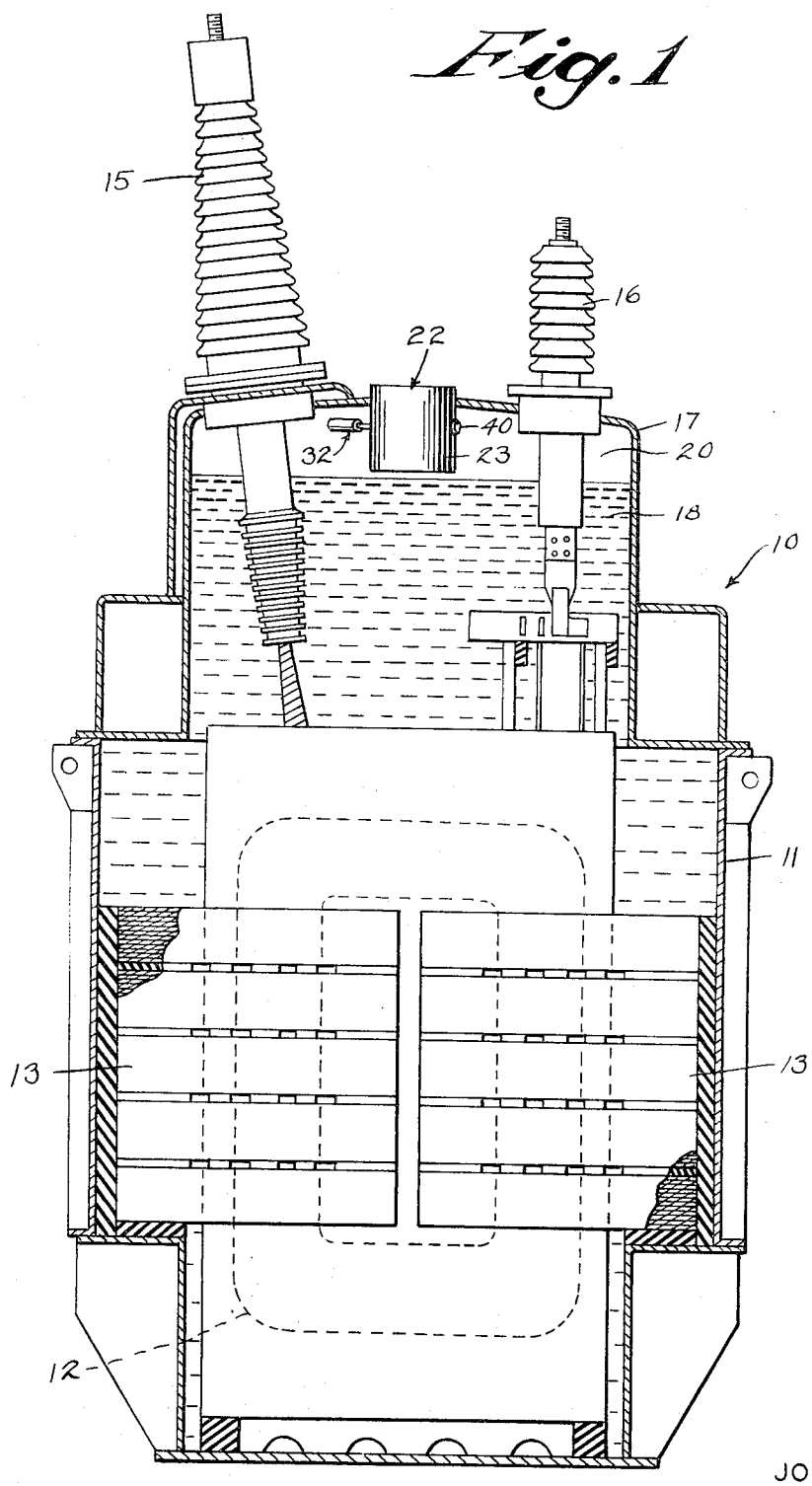
FIG. 1 is a vertical sectional view through an oil-filled sealed power transformer embodying the invention.

Referring to the drawing, a shell type electrical power transformer 10 in conventional manner includes a metallic casing 11 housing a coil 12 inductively linked by a magnetic core 13. Electrical connections are made to the primary and secondary windings (not shown) of coil 12 through primary and secondary insulating bushings 15 and 16 respectively mounted on cover section 17 of casing 11. A suitable insulating liquid dielectric 18 such as transformer oil fills the casing 11 to a level above the core 13 and coil 12, and a cushion of inert gas 20, preferably nitrogen, fills the casing above the oil 18. The casing and the transformer core and coil constitute no part of the present invention and are not described in detail, reference being made to U.S. Pat. No. 3,082,391 to Alexander Chiki, having the same assignee as this invention, for details of construction.

Many faults in such a power transformer 10 are preceded by an incipient stage of gradual deterioration and gas evolution, and in some cases an incipient fault and resulting gas evolution may persist for as long as several months before developing into an actual failure and outage. The progress of an incipient fault produces local heating which may decompose the solid insulation in the coil 12 and also the oil 18 with consequent production of several gases, some of which are combustible. Field experience has shown that at least 16 different gases may be produced by incipient faults, but not all of the 16 appear in the space 20 above the oil 18. The absence of some and the reduced concentration of other gases is due to the varying proportion of gases produced by different types of faults, the different solubility characteristics of the gases in the oil, and the relative instability of some of the gases. For example, acetylene has high solubility in oil and is quite unstable, and though a gas sample collected in the immediate vicinity of a fault usually contains a high percentage of acetylene, a sample taken from the gas space 20 rarely contains any acetylene.

Figure 2:
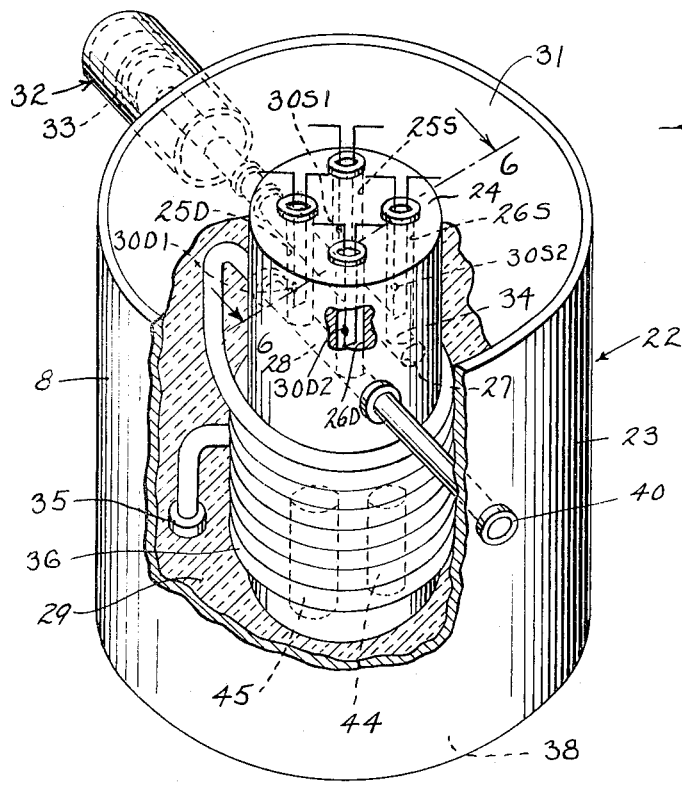
FIG. 2 is a perspective view of the continuous gas monitoring means of the transformer of FIG. 1.

With reference to FIGS. 1 and 2, the detector means 22 of the invention for continually monitoring and sampling the gas from gas-cushion 20 for presence of gases generated by incipient faults within the transformer is disposed within a generally cylindrical housing 23 secured adjacent its upper end by suitable means such as welding to the cover section 17 so that gas detector 22 is isolated from gas-cushion 20 but so gas from space 20 passes through the detector 22. Gas detector 22 includes a detector housing block 24 provided with four thermal conductivity cells defined by four identical vertically extending cavities, or thermistor wells, 25S, 25D, 26S, and 26D. The detector housing block 24 may be of a thermally conductive material such as a metal. Suitable heat insulating material 29 may be disposed between detector block 24 and the walls of housing 23. Cavities 25S and 26S are in communication with conduit means 27 in detector block 24, and the other two cavities 25D and 26D are in communication with conduit means 28 in detector block 24. The cavities 25S, 25D, 26S, 26D respectively house identical resistance elements 30S1, 30D1, 30S2 and 30D2, preferably thermistors, having a high temperature coefficient of resistivity. The resistance elements 30S1, 30D1, 30S2 and 30D2 are mounted in an identical manner in the thermistor walls, or cavities 25S, 25D, 26S and 26D, so that they all have the same radiation and heat dissipation characteristics. Conduit means 27 extends through a side wall 8 of housing 23 and is closed by a pressure regulating means 32 disposed within gas space 20, and conduit means 27 and cavities 25S and 26S are filled with a gas 34, preferably the same gas as in cushion 20, i.e., pure nitrogen, which provides a standard with which the gas in space 20 can be compared at all times. The two cavities 25S and 26S are connected by conduit means 27, and pressure regulating means 32 maintains the nitrogen 34 within conduit means 27 at a pressure which is a function of, and preferably equal to, the pressure within gas space 20, so as to make the gas detector 22 insensitive to pressure changes within the space 20 above the oil 18 in the transformer casing 11. Pressure regulating means 32 may include a free moving piston 33 exposed on one side to gas space 20 and on the other side to conduit means 27 so that change of pressure within casing 11 causes piston 33 to transmit the pressure change to gas 34 within standard cells 25S and 26S.

It can be seen in FIG. 2 that one end of conduit means 28 is in communication with one end of a heater coil 36 of tubing of high heat conductivity metal such as copper. The other end 35 of coil 36 constitutes the gas intake port of the detector 22 and extends through bottom wall 38 of housing 23 and is in communication with the gas-cushion 20. An output pipe 40 communicates with the other end of conduit means 28 and extends through side wall 8 of housing 23 and is in communication with the gas space 20 and constitutes the outlet port of the means for circulating gas from cushion 20 through the detector 22. Heater coil 36 constitutes conduit means for delivering gas from cushion 20 to detector thermal conductivity cells in cavities 25D and 26D, and pipe 40 constitutes the means for returning the gas from the detector cells to the gas cushion.

Figure 6:
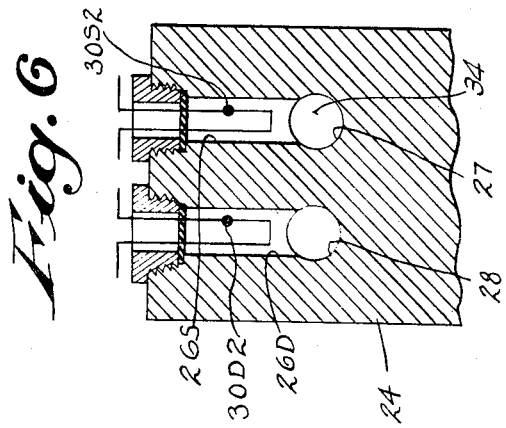
FIG. 6 is a sectional view taken through the detector block along line 6—6 of FIG. 2.
Figure 5:
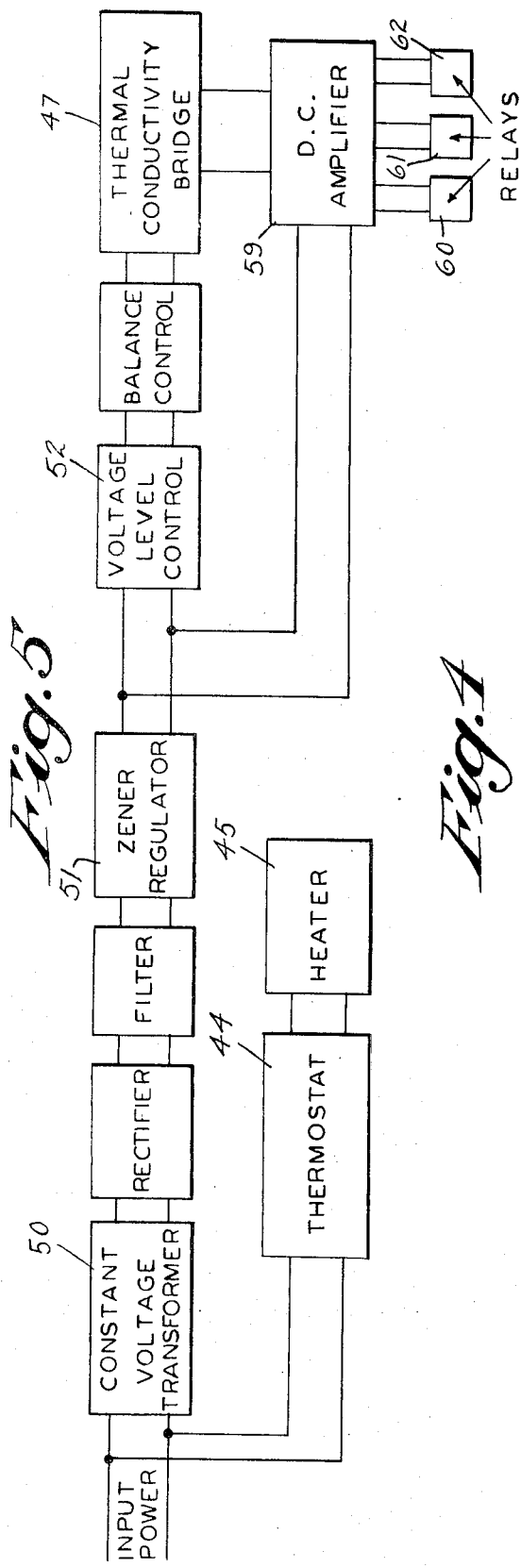
FIG. 5 is a block electrical circuit diagram of the gas monitoring means.

Detector block 24 has vertically extending apertures open from the bottom end thereof which respectively enclose a thermostat 44 and a heater 45 which may be of the electrical resistance type. Heater 45 raises the temperature of detector block 24 and coil 36, and thermostat 44 controls the electrical circuit to heater 45 and maintains detector block 24 and heater coil 36 at a predetermined temperature, preferably 100°C., sufficiently above the maximum operating temperature of transformer oil 18 so that the balance of the thermal bridge 47 having the thermistors 30S1, 30D1, 30S2 and 30D2 in the arms thereof is not affected by changes in the temperature of gas-cushion 20. The temperature of the upper end of heater coil 36 is maintained above that of inlet port 35, and the thermal gradient along heater coil 36 causes gas within space 20 to rise in inlet port 35 and flow by convection through coil 36 and out of outlet port 40 and thus past cavities 25D, 26D, containing the detector thermistors 30D1 and 30D2. The cavities, or thermistor wells 25S, 25D, 26S and 26D are perpendicular to conduit means 27 and 28 and the thermistors 30S1, 30D1, 30S2, and 30D2 are positioned a considerable distance above the entrance to the cavities to prevent the gas in the conduit means 27, 28 from flowing directly past the thermistors so as to minimize the gas flow cooling effect on the thermistors (see FIG. 6). The gas in conduit means 27 and 28 thus enters the upper portion of cavities 25S, 25D, 26S and 26D and contacts the thermistors largely by dispersion and diffusion perpendicular to the direction of gas flow, thereby providing excellent stability for the thermal conductivity bridge even under large changes in the rate of gas flow through the heater coil 36.

Figure 3:
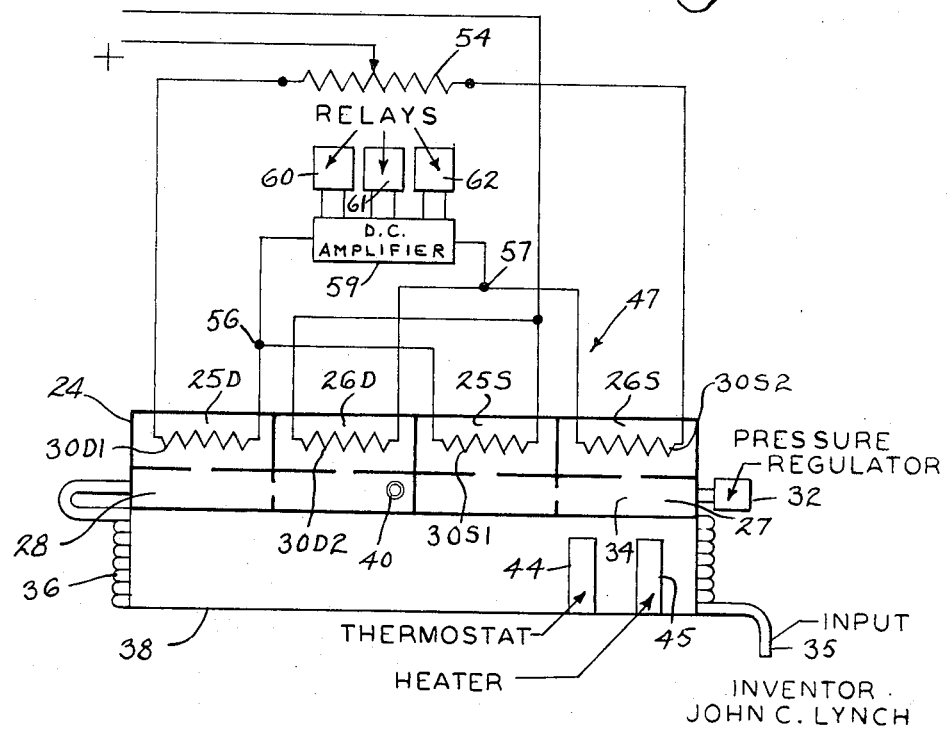
FIG. 3 is a schematic diagram of the gas monitoring means including the circuit of the thermal conductivity bridge.
Figure 4:
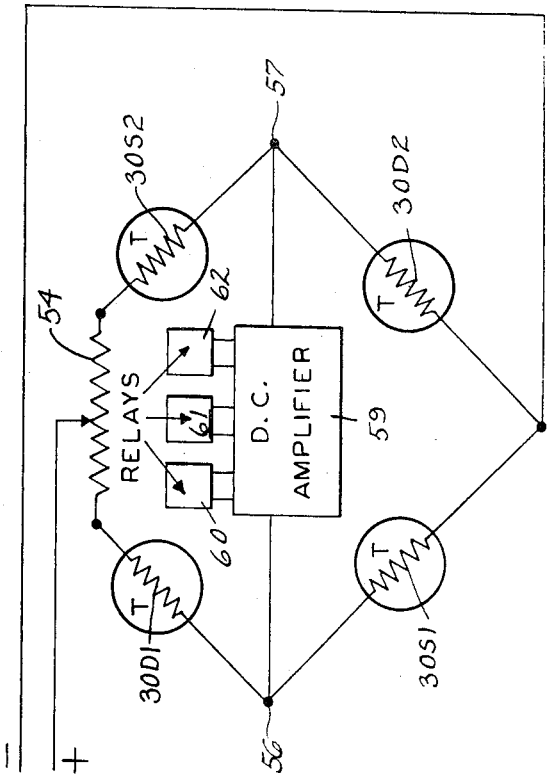
FIG. 4 is a schematic circuit diagram of the thermal conductivity bridge.

Thermistors 30S1, 30D1, 30S2 and 30D2 are connected in thermal conductivity bridge 47, as illustrated in FIGS. 3 and 4, which generates an electrical signal proportional to the difference in the thermal conductivity of the gases in the detector and standard thermal conductivity cells. Regulated d.c. voltage is supplied to bridge 47 from a constant voltage transformer 50 whose rectified output voltage is maintained constant by a Zener diode 51 and is fed through a voltage level control 52 which permits variation of the voltage applied to the bridge 47 during initial balancing in order to compensate for any differences in the characteristics of the impedances. Current from the regulated d.c. power supply is divided in the bridge 47, part flowing in series through thermistors 30D1 and 30S1 and the remainder flowing in series through thermistors 30S2 and 30D2. A rheostat 54 connected with its resistance element in series with thermistors 30D1 and 30S2 permits balancing the bridge so that the current flow in the two halves is identical and the standard and detector resistor elements are heated to the same degree when gas space 20 contains pure nitrogen and no unbalance voltage appears across the bridge output terminals 56 and 57. A d.c. amplifier 59 connected across the output terminals 56 and 57 of the bridge 47 detects the amount by which the bridge is unbalanced and amplifies the unbalance output signal to a level which will permit operation of relays 60, 61 and 62 which are calibrated to be actuated when predetermined unbalance signals are generated by bridge 47.

An incipient fault within the transformer will heat the oil 18 and the solid insulation in coil 12 and generate hydrocarbon gases and hydrogen. These gases generated by decomposition of the transformer insulation will evolve through the oil 18 and diffuse into the nitrogen in gas space 20. I have found that hydrogen is present in the highest percentage of any of the gases in samples collected in the immediate vicinity of faults involving oil only and also those in the vicinity of faults involving both paper and oil. Further, the thermal conductivity of hydrogen is approximately 10 times higher than that of nitrogen. If a fault occurs within the transformer 10, hydrogen will be evolved into the gas space 20 and the thermal conductivity of the mixture of gases in space 20 will increase. The gas in space 20 is continuously circulated by convection through heater coil 36 and past detector thermistors 30D1 and 30D2 in cavities 25D and 26S, and the thermal conductivity of the circulating gas from space 20 above the oil is compared to that of the pure nitrogen 34 in conduit means 27 by the thermal conductivity bridge 47. A continuous sampling and analysis of the gas from cushion 20 is thus effected. If said gas contains hydrogen, the detector thermistors 30D1 and 30D2 will be exposed to the hydrogen and cooled to a greater extent due to convection, radiation and conduction of heat to detector block 24 than the standard thermistors 30S1 and 30S2 exposed to the nitrogen 34 which is the standard gas, thereby causing an unbalance current to flow in the bridge and through the d.c. amplifier. If the unbalance signal is of a predetermined magnitude indicating that an incipient fault exists in the transformer, for example, that gas in space 20 contains 0.5 percent hydrogen, the output from d.c. amplifier 59 may actuate a relay 60 which, in operating, gives an indication that an incipient fault exists within the transformer. It is apparent that relay 60 can control a visible or audible indicator, or if desired, relay 60 can control deenergization of the power transformer and its removal from service and also control energization of a second power transformer in parallel with the deenergized unit so that outage of customer electrical service does not occur and remedial action can be taken on the transformer removed from service.

In the embodiment of the invention illustrated in FIGS. 7 and 8, the elements of the gas monitor identical with those elements shown in FIGS. 1–6 are referred to by the same reference numerals with the addition of the prime (') designation. A shell type power transformer 10' is shown in FIG. 7. The transformer 10' includes a metallic casing 11' housing a coil 12' inductively linked by a magnetic core 13'. Primary and secondary bushings 15' and 16' are mounted at the top of transformer 10'. A liquid dielectric 18' fills the casing 11' to a level above the core 13' and coil 12', and a cushion of inert gas 20' fills the casing above the oil 18'.

A gas monitor cabinet 70 is mounted on the casing 11' and contains the detector means 72 and a cabinet 74 housing the thermal conductivity bridge 47', voltage level control 52', Zener diode regulator 51', constant voltage transformer 50', rheostat 54', d.c. amplifier 59' and relays 60', 61' and 62'. Inasmuch as the latter elements are identical to the corresponding elements shown in FIGS. 4 and 5, they are not shown in FIGS. 7 and 8 and the discussion of their operation will not be repeated. Also housed in cabinet 70 are the flow gauge 76, pump 78 and sump 80. The inlet conduits 82, 84 and 88, together with the sump 80 and pump 78, connect the interior of the casing 11' and the block means 90. The conduit 82 is in communication with the gas space 20'. The return conduits 92 and 94, together with flow gauge 76, also connect the interior of casing 11' and the block means 90. Similar to conduit 82, the conduit 92 is in communication with the gas space 20'.

In FIG. 8, the block means 96 is shown connected to block means 90 by brackets 98. The block means 90 and 96 are both positioned within cabinet 74 and surrounded by heat insulating material 29' (not shown). The block means 90 is provided with cavities 25S', 25D', 26S', 26D' and conduit means 27' and 28'. The resistance elements 30S1', 30D1', 30S2' and 30D2' are mounted within cavities 25S', 25D', 26S' and 26D' and are connected in the thermal conductivity bridge 47'. The conduit means 28' is in communication at its opposite ends with inlet conduit 88 and return conduit 94. The conduit means 27' opens through the side wall 100 of block means 90 and, together with cavities 25S' and 26S', is filled with a gas 34' which is preferably the same gas as in cushion 20'. A sealing cap 102 closes the open end of conduit means 27' so that the gas 34' therein is maintained at a pressure which does not vary with atmospheric pressure and which has a predetermined constant value or value range relative to the pressure of the gas in cushion 20'. An example of of a satisfactory pressure value is one intermediate the extremities of the range that the gas from cushion 20' will cover.

A thermostat 44' and a heater 45' are mounted within the block means 96 and function to minimize the effect of changes in temperature of gas from cushion 20' on the thermal conductivity bridge 47'. The inlet conduit 88 is shown in FIG. 8 as being positioned adjacent to and coiled about the block means 96. This particular positioning of the conduit 88 results in convection flow of the gas in conduit 88, however, it should be understood that conduit 88 need not be coiled about or positioned adjacent the block means 96 to obtain gas flow in this embodiment of the invention.

In operation, the gas in cushion 20' is circulated through inlet conduits 82, 84 and 88, sump 80, conduit means 28', return conduits 94 and 92 and flow gauge 76. The sump 80 serves to remove moisture and any debris in the gas being circulated and the flow gauge 76 measures the flow rate of the gas. Although the gas is positively pumped through conduit means 28', the arrangement of the thermistors within the cavities and their position relative to the conduit means 28' minimizes the gas flow cooling effect on the thermistors.

In this manner the gas from the gas-cushion 20' is continuously sampled and an analysis of its content made. In the event that an incipient fault occurs within the transformer the gases generated by decomposition of the transformer insulation will be detected due to the difference in thermal conductivity between such generated gases and the standard gas. Since the pressure of the gas in the cushion 20' of the transformer 10' is always normally within a predetermined range relative to the pressure of the standard gas 34', the difference in thermal conductivity between the standard gas and the gases generated by decomposition of transformer insulation, particularly hydrogen, is sufficient to provide a very reliable indication of incipient fault.

While two specific embodiments of the invention have been shown herein, it will be realized that many modifications thereof are feasible without departing from the spirit and scope of the invention. For example, positive pumping or convection circulation may be used together or may be used alone in either of the embodiments disclosed. Also, the pressure regulating means 32 may be used in either of the embodiments or either embodiment may have its standard gas maintained at a pressure fixed relative to the pressure of the gas in the gas cushion.

What is claimed is:

1. A gas analysis apparatus for an inert gas cushion electrical transformer comprising, a block of thermally conductive material, first and second thermal conductivity cells, first and second thermistors respectively positioned within said first and second thermal conductivity cells, a known gas within said first conductivity cell and said inert gas from said cushion in said second thermal conductivity cell, detector means including a thermal conductivity bridge having said first and second thermistors in the arms thereof for detecting the presence of a gas in said second thermal conductivity cell having a thermal conductivity different from that of said known gas, means for heating said thermally conductive block, first conduit means connecting said gas cushion and said second thermal conductivity cell for delivering gas from said gas cushion to said second thermal conductivity cell, said first conduit means having a length positioned immediately adjacent said block, said length being sufficient to absorb the heat required to establish a thermal gradient of sufficient amount along said length that gas from said cushion convectively flows from said cushion to said second thermal conductivity cell and second conduit means connecting said gas cushion and said second cell for delivering gas from said second cell to said gas cushion.

2. The method of detecting a fault in a transformer within a casing normally containing a inert gas cushion comprising the steps of flowing the gas from said gas cushion into a first analysis cell and from said first analysis cell back to said gas cushion, isolating said gas from the atmosphere external of the transformer during the flowing step, comparing the change in resistivity of a resistance element positioned in said first analysis cell when said resistance element is exposed to said gas to the resistivity of another resistance element positioned in a second analysis cell and exposed to a standard gas and maintaining the gas delivered to the first analysis cell at a constant temperature relative to the standard gas in the second analysis cell to compensate for any difference in temperature between said gases.

3. In combination, a sealed transformer casing, dielectric liquid within said casing, a transformer core and coil assembly immersed in said liquid within said casing, an inert gas cushion within said casing above said liquid, and a gas analysis apparatus sealed from the surrounding atmosphere and comprising first and second thermal conductivity cells, a known gas within said first conductivity cell and said inert gas from said cushion in said second thermal conductivity cell, detector means for delivering an electrical signal proportionate to the difference in thermal conductivity of the gases in said first and second cells, first conduit means for delivering gas from said gas cushion to said second thermal conductivity cell, second conduit means for delivering gas from said second cell to said gas cushion, and heating means for heating said first conduit to establish a thermal gradient therein whereby the inert gas from said cushion is convectively circulated to said second cell.

4. The method of detecting a fault in a transformer within a casing normally containing an inert gas cushion comprising the steps of flowing the gas from said gas cushion into a first analysis cell and from said first analysis cell back to said gas cushion, isolating said gas from the atmosphere external of the transformer during the flowing step, comparing the change in resistivity of a resistance element positioned in said first analysis cell when said resistance element is exposed to said gas to the resistivity of another resistance element positioned in a second analysis cell and exposed to a standard gas, equalizing the pressures of the inert gas and the standard gas and compensating for any difference in temperature between the standard gas and the gas from the gas cushion.

5. In combination, a transformer casing sealed from the surrounding atmosphere, dielectric liquid within said casing, a transformer core and coil assembly immersed in said liquid within said casing, a gas cushion within said casing above said liquid, and a fault gas analysis apparatus sealed from the surrounding atmosphere and comprising first and second thermal conductivity cells, a known gas within said first conductivity cell, conduit means containing only gas from said gas cushion for delivering only gas from said gas cushion to said second thermal conductivity cell and for returning only said gas from the gas cushion from said second thermal conductivity cell to the gas cushion, a pump connected to said conduit means, said pump containing only gas from said cushion and pumping only gas from said cushion through said conduit means, pressure regulating means for equalizing the pressures between the gas from the gas cushion and the known gas, and detector means for delivering an electrical signal proportionate to the difference in thermal conductivity of the gases in said first and second cells.

6. The method of detecting a fault in a transformer within a casing containing a gas comprising the steps of connecting said casing and a first analysis cell by a length of conduit containing said transformer gas, continuously heating said length of conduit to establish a thermal gradient along said conduit length to cause convective flow of the gas through the conduit to thereby continuously circulate the transformer gas from said casing into said first analysis cell and from said first analysis cell back to said casing; comparing the change in resistivity of a resitence element positioned in said first analysis cell when said resistance element is exposed to said transformer gas to the resistivity of another resistence element positioned in a second analysis cell and exposed to a standard gas and compensating for any difference in temperature between the reference gas and the transformer gas.

* * * * *